Dec. 14, 1971   C. G. BLANC   3,626,626

SHARK DART ELECTRONIC CIRCUIT

Filed July 24, 1970

INVENTOR.
CLARENCE G. BLANC
BY
THOMAS G. KEOUGH
ERVIN F. JOHNSTON
ATTORNEYS

United States Patent Office 3,626,626
Patented Dec. 14, 1971

3,626,626
SHARK DART ELECTRONIC CIRCUIT
Clarence G. Blanc, Escondido, Calif., assignor to the United States of America as represented by the Secretary of the Navy
Filed July 24, 1970, Ser. No. 58,025
Int. Cl. H05c 1/00; A01k 81/04; F41b 5/02
U.S. Cl. 43—6    5 Claims

ABSTRACT OF THE DISCLOSURE

An electronic circuit, including a source of DC potential connected to an astable multivibrator enabling a serially-connected switch interposed in the feedback loops of a switching inverter, couples an immobilizing electromotive force to the interior of a marine predator's body via a pathway between a blade-like electrode imbedded in the predator's body, ambient seawater, and a return electrode. An "on-off" duty cycle conserves the potential source to ensure a longer period of electronarcosis.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Contemporary cattle prod-like electric devices, employed for stunning or keeping marine predators at a distance, have suffered from the two major limitations, those being, that they require a diver to hold them against the surface of the predator, and that they often require high potentials creating an undue hazard to the diver. One approach for avoiding these limitations is disclosed in the pending U.S. patent application, Ser. No. 855,233, entitled: "Electronic Anti-Shark Dart" by Clarence S. Johnson and Henry D. Baldridge, filed Sept. 4, 1969. This shark dart uses a plurality of batteries along with an electronic circuit for providing shark immobilizing electrical power at a low level and at a safe distance from the diver. However, the batteries tended to degenerate rapidly when full duty cycle operation was demanded. The present invention is in superior circuit for conserving battery power while reliably providing the immobilizing electrical power.

SUMMARY OF THE INVENTION

The present invention is directed to providing a circuit for inducing electronarcosis in a marine predator and includes a source of DC power connected to a switching inverter. An astable multivibrator, having a predetermined switching rate, sequentially completes the switching inverter circuit, via a switching transistor, serially-connected in the inverter's feedback loops, to provide a partial duty-cycle conserving battery power and prolonging the effective life of the shark dart.

It is the prime object of the invention to provide an electronic circuit for creating an immobilizng electric current in a self-contained shark dart.

Yet another object is to provide an electronic circuit allowing only a partial duty cycle to conserve a limited potential source.

An ultimate object of the instant invention is to provide a compact, reliable, long-life, electronic circuit exposing a diver to minimum hazards when using an electric shark dart.

These and other objects of the invention will become readily apparent from the ensuing description when taken with the drawings.

DESCRIPTION OF THE PREFERRED EMBODIMENT

Figure 1:
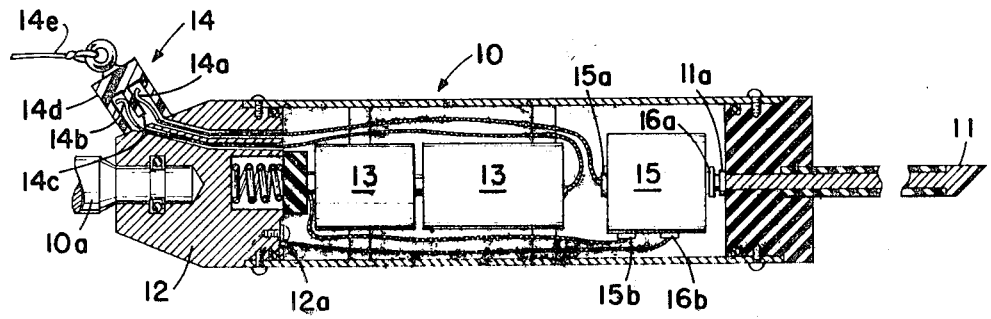
FIG. 1 is a cross-sectional depiction of the invention operatively disposed in a shark dart.
Figure 2:
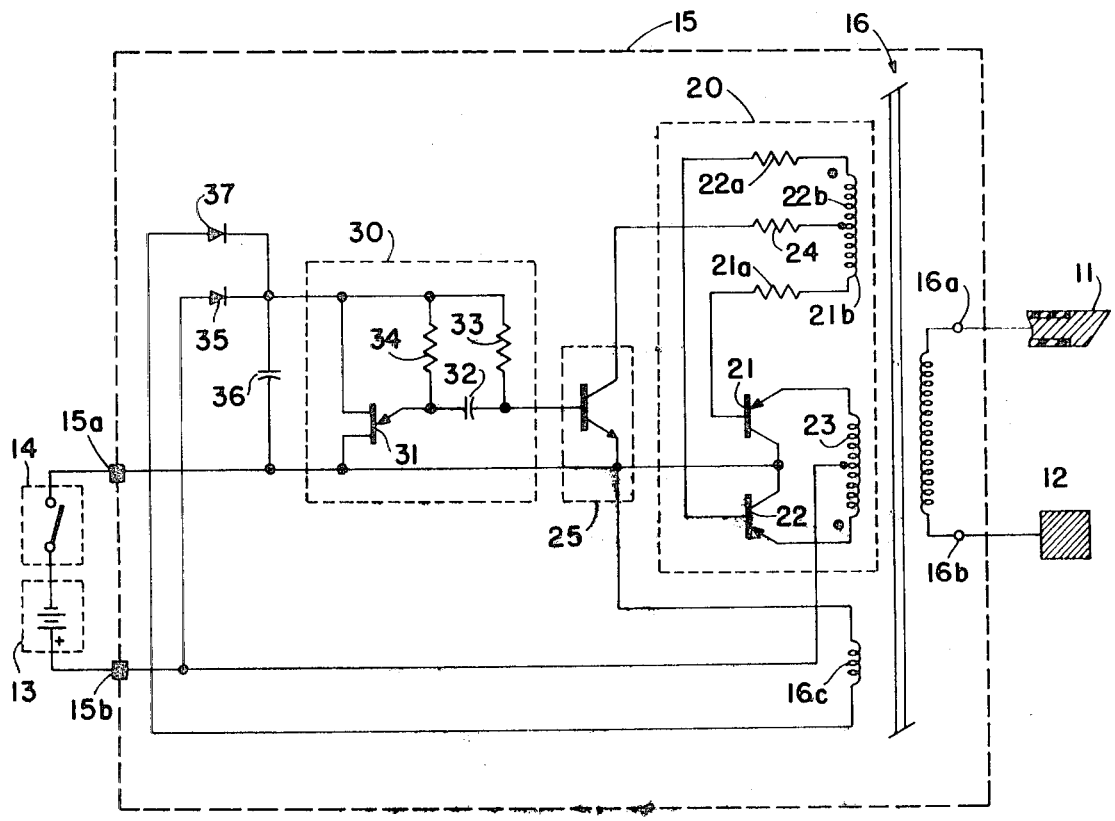
FIG. 2 is a schematic representation of the invention.

Referring, now, to the drawings, the invention improves the operating characteristics of the subject matter of a pending U.S. patent application, Ser. No. 855,233, entitled: "Electric Anti-Shark Dart" by Clarence S. Johnson and Henry D. Baldridge, filed Sept. 4, 1969. The application reveals that a state of electronarcosis, or paralysis, in a marine predeator is induced by passing a current through its body via an impaling electric anti-shark dart or projectile 10 separable from a spear gun shaft 10a. The present invention provides a means by which the effectivenss of the electric anti-shark dart is greatly increased by making the most efficient use of the available power source.

The circuit includes an electrode 11 having a blade-like configuration to enable penetration deep within a marine predator's body. Forming the butt end of the shark dart, a butt electrode 12 is also formed of a conductive material with its outer surface in electrical communication with the ambient seawater.

Internally stored within the shark dart's casing, serially-connected batteries 13, preferably being nickel cadmium for long life and rechargeability, are coupled to an enabling switch 14 carried on the exterior of the dart.

The switch has a pair of convergingly biased contacts 14a and 14b, separated by an insulating divider 14c extending from an insulating cup-shaped cap 14d separating the contacts and sealing them from external seawater. A forceful tug on line 14e removes the divider from between the contacts and th ey spring together to complete a circuit. Precise configuration of the switch is not critical to the invention save only for the fact that its manner of construction must be such as to shut out surrounding seawater preventing premature completion of a circuit, as well as allowing circuit actuation when desired.

Operatively connected to the aforedescribed elements, an electronic circuit 15, having a first terminal 15a connected to contact 14a and a second terminal 15b connected to the batteries, is provided to create a partial duty immobilizing current through the body of the predator to prolong the life of the batteries and, hence, the effectiveness of the shark dart.

Provision is made within this circuit to transfer a narcosis-inducing signal by including a coupling transformer 16, having output terminals 16a and 16b extending to the blade-shaped electrode at point 11a and the butt electrode at butt screw 12a.

On the primary winding side of the coupling transformer, a switching inverter 20, otherwise known as a DC-AC power oscillator, includes a pair of transistors 21 and 22 arranged in a push-pull relationship. A single primary winding 23, supplying flux for the coupling transformer, is center-tapped to link batteries 13 through the collectors of the pair of transistors. Each transistor base is connected to a separate feedback loop, resistor 21a and winding 21b forming separate elements in the feedback loop associated with transistor 21 and resistor 22a and winding 22b forming separate elements in the feedback loop associated with the transistor 22. Both feedback loops share a common resistor 24 that, with the exception of an element to be discussed below, completes the feedback loops of the switching inverter.

Completion of the switching inverter circuit to enable the generation of a predetermined alternating frequency, dependent on the magnitudes of components used, occurs when a transistor switch 25 conducts to complete the feedback loops of the switching inverter.

Sequential actuation of transistor switch 25 is ensured by including an astable multivibrator 30, coupled to the base of the transistor switch.

The astable multivibrator contains, as a primary component, a unijunction transistor 31 separated from the base of the transistor switch by a charging capacitor 32. A first resistor 33 is also joined to the base of the transistor switch and a second resistor 34 is connected across the emitter and base of the unijunction transistor.

A power supply path from source 13 is set up, initially, through a first diode 35 and resistor 33 to actuate transistor switch 25 and to start oscillation in switching inverter 20. After the switching inverter begins oscillating, a second power supply path, through winding 16c and second diode 37, enables the storing of a firing charge for unijunction transistor 31 on storage capacitor 36 to ensure an astable multivibrator capability.

The electronic cooperation of the aforedescribed circuit passing an immobilizing signal to a shark, or similar predator, becomes more apparent from the following functional description of the circuit's operation.

When blade electrode 11 is inserted deeply into the body of a shark and cap 14d is pulled from enabling switch 14, the serially-connected batteries are connected to switching inverter 20. Since a perfect balance is not achieved between active and passive components included in the two feedback loops associated with transistors 21 and transistors 22, oscillation starts at a frequency predetermined by the values of the resistive and reactive components in each feedback loop.

Although the battery also supplies power to astable multivibrator 30 through the path including first diode 35, unijunction transistor 31 does not fire, for it requires a firing potential more than that provided from battery 13 alone. Winding 16c transfers a signal through second diode 37 and reoccurring additive, half-wave portions of an induced voltage in winding 16c are built up on storage capacitor 36. As the critical firing potential supply voltage is accumulated on capacitor 36, usually within two or three cycles, it is also built up on capacitor 32 via resistor 34.

The unijunction transistor fires and the potential on the emitter of transistor switch 25 drops since the change of voltage caused by the unijunction transistor's firing is transferred to the base of the transistor switch via charging capacitor 32.

The transistor switch turns "off" and the switching inverter is turned "off." Alternating power ceases to be fed to the electrodes and the accumulated signal on capacitor 32 is drained through the unijunction transistor.

Because enabling switch 14 is still closed during the "off" portion of the cycle, battery power is once again fed through diode 35 and resistor 33 to accumulate a charge on capacitor 32. When the accumulated charge reaches the firing potential of transistor switch 25, it conducts, ending the "off" portion and restarting the "on" portion of the duty cycle. Upon reactuation of the transistor switch, the switching inverter is again enabled and an immobilizing signal is again fed to electrodes 11 and 12. Increasing the magnitude of resistor 33 increases the "off" time of the switching inverter; increasing the magnitude of resistor 34 increases the "on" time of the switching inverter; and increasing the magnitude of charging capacitor 32 decreases the switching rate between the "on" and "off" state, but does not affect the duty cycle. Experience has demonstrated that a fifty percent duty cycle, a cycle in which immobilizing alternating currents are fed to a shark fifty percent of the time in intermittent bursts, is sufficient to maintain electronarcosis.

In a representative embodiment of the invention having a fifty percent duty cycle, batteries 13 were two "Sonotone 2H120 NiCd" batteries and coupling transformer 16 was a number 37D4601 having a magnetic core. Transistors 21 and 22 were both "2N2912's" and transistor switch 25 was an "NPS6520." Unijunction transistor 31 was a "2N4871" and first and second diodes 35 and 37 were "1N4001's." All the resistors had a one-fourth watt rating with resistors 21a and 22a both having a value of 22 ohms, and common transistor 24 having a value of 39 ohms. Resistor 33 had a 15 kilohm value and resistor 34 had a 4.7 kilohm value. Charging capacitor 32 had a 47 microfarad rating at 6 volts and storage capacitor 36 had a 15 microfarad rating at 20 volts.

With the above enumerated elements, the output signal across electrodes 11 and 12 had a 60 volt peak-to-peak spread at a frequency between 1 to 2 kilohertz. The astable multivibrator switched the 1 to 2 kilohertz 60 volt peak-to-peak signal at a 1 hertz rate with a 50% duty cycle. Thusly, 15 watts of immobilizing power were fed to the marine predator, in this instance, a large shark, for over twenty minutes, far in excess with the total time period had the switching inverter been actuated 100% of the time.

Coating electronic circuit 15 with a dielectric to encase the elements from the surroundings increased reliability by preventing short circuiting caused by leaks through the shark dart housing.

Obviously, many modifications and variations of the present invention are possible in the light of the above teachings, and, it is therefore understood that within the scope of the disclosed inventive concept, the invention may be practiced otherwise than as specifically described.

What is claimed is:

1. An impaling projectile and circuit for inducing electronarcosis in a marine predator comprising:
   a source of DC power;
   means connected to the power source for converting same to alternating energy;
   switching means interposed in the feedback loops of the converting means;
   means for enabling said switching means to create sequential bursts of said alternating energy;
   a first and a second electrode means carried by the projectile, the first of which being shaped for insertion in said marine predator, the second of which being electrically in contact with the ambient water; and
   means coupling said converting means to both said electrode means, upon said insertion, passing immobilizing said sequential bursts for prolonged periods of time between said first and said second electrode means, through said ambient water and through the body of said marine predator.

2. A circuit according to claim 1 further including:
   a switch connecting said power source to said converting means for actuation only upon said insertion.

3. A circuit according to claim 1 further including:
   an insulating composition encasing said circuit to render it immune from short circuiting by said ambient water.

4. A circuit according to claim 2 in which said converting means is a push-pull inverter, and said switching means is a transistor serially coupled in said feedback loops.

5. A circuit according to claim 4 in which the enabling means is an astable multivibrator coupled to the base of said transistor.

References Cited

UNITED STATES PATENTS

| | | | |
|---|---|---|---|
| 8,843 | 3/1852 | Sounenburg et al. | 43—6 |
| 2,805,607 | 9/1957 | Ryan | 273—106.5 |
| 3,310,754 | 3/1967 | Stewart | 331—112 |
| 3,362,711 | 1/1968 | Larsen et al. | 231—2 E |
| 3,484,665 | 12/1969 | Mountjoy et al. | 317—262 |

ALDRICH F. MEDBERY, Primary Examiner

U.S. Cl. X.R.

231—2 E; 273—84, 106.5; 317—262; 331—112